Patented Feb. 1, 1949

2,460,436

UNITED STATES PATENT OFFICE 2,460,436

MERCAPTO ALCOHOL ESTERS

Bernard H. Shoemaker, Hammond, and Chester E. Adams, Highland, Ind., and Wayne A. Proell, Chicago, Ill., assignors to Standard Oil Company, Chicago, Ill., a corporation of Indiana No Drawing. Application June 9, 1945,
Serial No. 598,630

10 Claims. (Cl. 260—475)

This invention relates to novel sulfur-containing compounds. More particularly it relates to novel organic mercapto alcohol esters.

It is an object of our invention to provide, as new compositions of matter, neutral and acid mercapto alcohol esters of polybasic carboxylic acids. Another object is to provide novel plasticizing compositions for natural and synthetic resinous and plastic materials comprising mercapto alcohol esters of polybasic carboxylic acids. A further object is to provide novel mercapto alcohol esters which may be used as raw materials for chemical synthesis or may be employed as solvents, insecticides and for other uses. Additional objects of our invention will become apparent from the ensuing description thereof.

By the term "mercapto alcohol" we intend to designate an alcohol containing a thioether linkage.

In the manufacture of plastics today, large amounts of plasticizers having very special properties are employed. Thus with polyvinyl chloride resins, certain compositions contain as much as 50% plasticizer. Some of the important properties essential to a successful plasticizer are as follows:

1. A very low vapor pressure,
2. Satisfactory color and odor,
3. Stability,
4. Freedom from bleeding.

The phthalate esters are being used widely as plasticizers for polyvinyl chloride resins. Di-n-butyl phthalate is low boiling and evaporates too rapidly to be ideally suited for the purpose. Di-octyl phthalate is superior to di-n-butyl phthalate. Again, the alcohol employed must be a primary alcohol since the phthalate esters of secondary and tertiary alcohols hydrolyze too readily. The cost and availability of these higher primary alcohols limit their utility.

Mercapto alcohol esters of polybasic acids present a considerable advantage over prior art organic ester plasticizers. The presence of the sulfur in the alcohol raises the boiling point considerably and unexpectedly reduces the solubility of the esters in water, thus reducing or entirely eliminating the loss of our novel mercapto alcohol ester plasticizers from plastics upon contact with water or aqueous solutions.

The mercapto alcohol esters of this invention can be synthesized by a variety of methods. In a particular case the method of synthesis which is selected will depend upon the specific properties of the starting materials, the type of reaction equipment which is available and the specific economic situation. As a generality, the synthesis involves the preparation of a mercapto alcohol or a reactive derivative such as the corresponding esters, for example, halides, sulfates, phosphates, or organic esters such as acetates. The mercapto alcohol or a reactive derivative is then reacted with the desired polybasic carboxylic acid or an equivalent material which may in some instances be the corresponding acid anhydride or a salt of the acid, etc. to produce the desired mercapto alcohol ester.

Mercapto alcohols can be prepared by the following methods, which are set forth in the nature of examples:

(a) The reaction of a mercaptan with a chlorohydrin as described, for example, in Ellis's "Chemistry of Petroleum Derivatives," vol. 2 (1937), page 526. The reaction is effected in caustic aqueous solution, and occurs rapidly at room temperature with considerable heat evolution. The reaction product, which separates as an upper layer, may be recovered and purified by distillation, dried, etc.;

(b) The reaction of a mercaptan with an olefin oxide as described, for example, in Ellis (supra) at page 564;

(c) The reaction of a mercaptan with a keto-alcohol or an aldehyde-alcohol, e. g.,

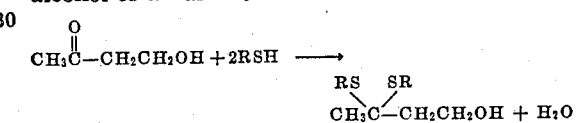

(d) The reaction of an organic halide or equivalent ester with an alcohol containing a sulfhydryl group. This reaction is usually effected in an alkaline solution or with a basic catalyst such as a sodium alkoxide, e. g., sodium methoxide. Thus, n-butyl bromide may be treated with monothiothylene glycol

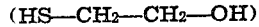

in a caustic solution to produce beta-butylmercapto ethanol.

Hemi-mercaptals and hemi-mercaptols may be prepared by conventional methods and esterified with polybasic carboxylic acids in accordance with this invention. In some instances it is more desirable to employ the halide derivatives of the hemi-mercaptals or hemi-mercaptols and to react these with salts of polycarboxylic acids. The halide derivatives of hemi-mercaptals and hemi-mercaptols may be prepared in accordance with the procedure of H. Bohme, Ber. 69, 1610 (1936), C. A. 30, 6323 (1936) and L. A. Walter et al., J. Am. Chem. Soc. 67, 655 and 657 (1945). We may also employ glycerol thioethers containing at least one hydroxyl group for the purposes of our invention.

Suitable mercaptans which we can employ for the production of mercapto alcohols and their derivatives include methyl, ethyl, isopropyl, butyl, amyl, lauryl, allyl, methallyl, vinyl, cyclohexyl, phenyl, and benzyl mercaptans or their mixtures, or mixtures of aliphatic mercaptans containing between 1 and 10 carbon atoms in the molecule such as are obtained by the extraction of petroleum naphthas with caustic solutions containing solubility promoters such as potassium isobutyrate and the like (the so-called solutizer processes).

The mercapto alcohol ester of a polybasic acid can be prepared by reacting the polybasic acid with the mercapto alcohol. This is usually accomplished by refluxing the reactants, optionally in the presence of an esterification catalyst such as sulfuric acid, sulfonic acids or other esterification catalysts known in the art. In certain instances it may be convenient to react the mercapto alcohol with the anhydride of the polybasic acid. Where an esterification of the alcohol and the acid or anhydride proceeds with difficulty or with low yields, it may be more desirable to react a salt of the polybasic acid, e. g., an alkali metal or heavy metal salt with a halide derived from the mercapto alcohol by replacement of its hydroxyl group.

Another method of synthesizing the mercapto alcohol esters of our invention comprises forming an ester of the mercapto alcohol with a volatile carboxylic acid, e. g., formic or acetic acids, and reacting the resulting ester with the less volatile polybasic acid, ordinarily in the presence of a small amount of a catalyst such as sulfuric acid or the like, under conditions adapted to volatilize the low boiling acid from the reaction zone as it is generated by the acidolysis reaction. In a modification of this procedure, we may react a mercapto alcohol with one of the lower alcohol esters of the polybasic acid, whereby alcoholysis occurs to yield a volatile alcohol derived from said ester and a relatively high boiling mercapto alcohol ester of the polybasic acid. The volatile alcohol is removed from the alcoholysis zone as formed to drive the reaction towards completion.

By control of the ratio of mercapto alcohol to the polybasic acid we can synthesize either acid esters or neutral esters and both are contemplated for the purposes of our invention. Other methods of synthesizing mercapto alcohol esters of polybasic carboxylic acids will no doubt suggest themselves to those skilled in the art.

Suitable polybasic acids which we may employ for the preparation of mercapto alcohol esters include aliphatic dibasic acids such as oxalic, malonic, succinic, glutaric, adipic, pimelic, sebacic; unsaturated dibasic acids such as maleic, dichloromaleic, monochloromaleic, fumaric, itaconic, pentenyl succinic, citraconic, mesaconic, and glutaconic; tribasic acids such as citric, aconitic, and aurin tricarboxylic; aromatic acids such as phthalic, isophthalic, terephthalic, ortho- and para-diphenic acids and methylene bis-salicylic acid. Also, we may employ 1,4-tetradecane-dicarboxylic acid and other dibasic acids having more than 10 carbon atoms, such as can be obtained by nitric acid oxidation of the hydroxy acids resulting from hydrolysis of sulfated oleic acid.

An ester in accordance with our invention was made as follows: to ethyl mercaptan (64 g.) dissolved in 45 g. caustic and 500 cc. water, there was slowly added ethylene chlorohydrin (80 g.) at a temperature of about 20° C. A rapid reaction was maintained accompanied by considerable heat evolution. The reaction product, beta-ethylmercapto ethanol, separated as an upper layer from the aqueous solution and additional material was salted out with $K_2CO_3$ (27 g.) The alcohol was purified by distillation, the initial 20% overhead being discarded. The mercapto ethanol was then heated with phthalic anhydride (20 g.) at temperatures between about 240 and 290° F., whereupon the diester, bis (beta-ethylmercapto ethyl) phthalate, was readily formed. We have found that the diester does not form at an appreciable or useful rate at temperatures in the range of about 100 to 200° F. The diester was found to decompose at about 320° F. to yield phthalic anhydride and a high-boiling dithio ether. The diester was a pale, viscous, high-boiling liquid having a mild, weak odor. It was insoluble in water and soluble in paraffin and aromatic hydrocarbons and acetone.

In similar fashion, bis (beta-butylmercapto ethyl) phthalate was made. The crude ester was an orange oil.

Polyvinyl chloride resin was plasticized with 40 weight per cent of the bis (beta-ethylmercapto ethyl) phthalate whose production was described above to yield a product which was clear, elastic, tough, and showed no tendency toward bleeding. This sample of plasticized resin was allowed to remain in the laboratory atmosphere for six months and at the end of that time was found to be very flexible and in good condition, indicating that no oxidation or volatilization of the plasticizer had occurred and that no deterioration of the polyvinyl chloride had occurred. It is noteworthy that no mercaptan odor developed, an unexpected result. The plasticized polyvinyl chloride resin sample which had been allowed to age for six months was then subjected in an oven to a temperature of 338° F. for 15 minutes. As a result of the oven test a slight darkening of the sample occurred, probably due to partial decomposition of the diester plasticizer, but the plasticized resin sample was still very strong and elastic.

Our novel mercapto alcohol esters of polybasic carboxylic acids may be employed as plasticizers, softening agents and tackifiers for synthetic resins and rubbery materials of diverse types including alkyds such as the glyptals, the acrylate and methacrylate resins, vinyl chloride resins, vinylidene chloride resins, coal tar resins, polystyrene, styrene-butadiene resins, phenol-formaldehyde resins, resins derived from urea and melamine, butadiene-styrene and butadiene-acrylonitrile rubbers, butyl rubber, natural rubber, cellulose esters and ethers, nitrocellulose compositions, resins derived from synthetic polyhydric alcohols and the like. The amount of ester employed as plasticizer or softener will depend on the particular ester chosen for use, the particular plastic or rubbery material into which the ester is to be incorporated, and the degree of softening or plasticization which is desired. In general we may use between 5 and about 50 weight per cent of mercapto alcohol esters of polybasic acids in the resinous materials.

The novel esters of our invention may also be employed as solvents, alone or in conjunction with other solvents, and in insecticidal, fungicidal, larvacidal, and ovicidal compositions. The novel esters of this invention may also be converted into novel chemical derivatives such as the corresponding polysulfides, sulfoxides and sulfones, halogenated derivatives, etc. We may also employ metal or amine salts of the acid mercapto alcohol esters of polybasic carboxylic acids as addition agents to hydrocarbon oils such as lubricating oils, fuel oils, etc.

Having thus described our invention, what we claim is:

1. A hydrocarbonmercapto monohydric alcohol ester of a polybasic carboxylic acid.
2. A hydrocarbonmercapto alkanol ester of a polybasic carboxylic acid.
3. An alkylmercapto alkanol ester of a polybasic carboxylic acid.
4. An alkylmercapto alkanol ester of a polybasic carboxylic acid wherein the alkyl group contains between 1 and 10 carbon atoms.
5. A mixture of alkylmercapto alkanol esters of a polybasic carboxylic acid wherein the alkyl radical of the alkylmercapto group contains between 1 and 10 carbon atoms.
6. An alkylmercapto alkanol ester of an aromatic polybasic carboxylic acid.
7. An alkylmercapto alkanol ester of an aliphatic polybasic carboxylic acid.
8. An alkylmercapto alkanol ester of phthalic acid.
9. Bis (beta-ethylmercapto ethyl) phthalate having the formula

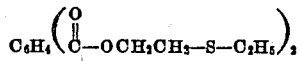

10. Bis (beta-butylmercapto ethyl) phthalate having the formula

BERNARD H. SHOEMAKER.
CHESTER E. ADAMS.
WAYNE A. PROELL.

REFERENCES CITED

The following references are of record in the file of this patent:

UNITED STATES PATENTS

| Number | Name | Date |
|---|---|---|
| 1,422,869 | Kranzlein | July 18, 1922 |
| 1,984,283 | Reid | Dec. 11, 1934 |
| 2,129,709 | Schuette | Sept. 13, 1938 |
| 2,193,963 | Harris | Mar. 19, 1940 |
| 2,349,414 | Ferrer | May 23, 1944 |
| 2,356,586 | Hentrich | Aug. 22, 1944 |

OTHER REFERENCES

Whitner et al., "J. Am. Chem. Soc.," (1921), vol. 43, pages 636–638.